(12) United States Patent
Jun et al.

(10) Patent No.: US 12,256,681 B2
(45) Date of Patent: Mar. 25, 2025

(54) WATER CULTURE BLOCK

(71) Applicants: Hyochan Jun, Jeju-si (KR); Jonghyun Jun, Auckland (NZ)

(72) Inventors: Hyochan Jun, Jeju-si (KR); Jonghyun Jun, Auckland (NZ)

( * ) Notice: Subject to any disclaimer, the term of this patent is extended or adjusted under 35 U.S.C. 154(b) by 180 days.

(21) Appl. No.: 17/586,009

(22) Filed: Jan. 27, 2022

(65) Prior Publication Data

US 2022/0142072 A1  May 12, 2022

Related U.S. Application Data

(63) Continuation of application No. PCT/KR2020/012683, filed on Sep. 21, 2020.

(30) Foreign Application Priority Data

Sep. 27, 2019 (KR) .................. 10-2019-0119695
Sep. 18, 2020 (KR) .................. 10-2020-0120453

(51) Int. Cl.
*A01G 31/02* (2006.01)

(52) U.S. Cl.
CPC .................................. *A01G 31/02* (2013.01)

(58) Field of Classification Search
CPC .. A01G 31/02; A01G 31/06; A01G 2031/006; A01G 27/06; A01G 9/02; A47G 7/08
See application file for complete search history.

(56) References Cited

U.S. PATENT DOCUMENTS

| 5,042,197 A | 8/1991 | Pope |
| 8,646,205 B2 * | 2/2014 | Cho .................. A01G 9/025 47/83 |
| 9,173,352 B1 * | 11/2015 | Moreland ............... E05C 19/00 |
| 9,775,330 B1 * | 10/2017 | Chen .................... A01K 63/00 |

(Continued)

FOREIGN PATENT DOCUMENTS

| CN | 2850252 Y | 12/2006 |
| CN | 201571901 U | 9/2010 |

(Continued)

OTHER PUBLICATIONS

International Search Report mailed Jan. 13, 2021 in International Application No. PCT/KR2020/012683, in 4 pages.

(Continued)

*Primary Examiner* — Ebony E Evans
*Assistant Examiner* — Katelyn T Truong
(74) *Attorney, Agent, or Firm* — Knobbe, Martens, Olson & Bear, LLP

(57) ABSTRACT

This application relates to a water culture block for growing aquatic plants. In one aspect, the water culture block includes a block body which includes a bottom plate and a plurality of side plates formed perpendicular to the bottom plate and having openings, the body block having an accommodation space formed therein. The water culture block may also include an overflow partition wall which is formed in the inner space of the block body so as to be perpendicular to the bottom plate, accommodates a plurality of holes passing through the bottom plate, and ensures that fluid overflowing from the block body is uniformly discharged through the plurality of holes.

15 Claims, 19 Drawing Sheets

(56) References Cited

U.S. PATENT DOCUMENTS

| | | | | |
|---|---|---|---|---|
| 2006/0123704 | A1* | 6/2006 | Yoshida | A01G 9/02 47/79 |
| 2012/0117870 | A1* | 5/2012 | Ness | A47G 7/08 47/65.7 |
| 2013/0104456 | A1* | 5/2013 | Smith | A01G 9/02 47/66.7 |
| 2013/0264921 | A1* | 10/2013 | Kumar | A47B 85/06 312/240 |
| 2014/0013663 | A1* | 1/2014 | Shein | E04B 1/541 47/66.1 |
| 2015/0048082 | A1* | 2/2015 | Galal | B65D 21/083 220/4.12 |
| 2016/0029573 | A1* | 2/2016 | Nam | A01G 9/023 47/65.5 |
| 2017/0223913 | A1* | 8/2017 | Ikard | A01G 31/02 |
| 2018/0103599 | A1* | 4/2018 | Zhan | A01G 9/249 |
| 2021/0352862 | A1* | 11/2021 | Zhao | A01G 31/02 |

FOREIGN PATENT DOCUMENTS

| | | |
|---|---|---|
| CN | 202035650 U | 11/2011 |
| CN | 102548389 A | 7/2012 |
| CN | 205468224 U | 8/2016 |
| CN | 107635395 A | 1/2018 |
| EP | 3295788 A1 | 3/2018 |
| JP | 55-029103 U | 2/1980 |
| JP | 2001-299097 A | 10/2001 |
| JP | 2002-345613 A | 12/2002 |
| JP | 2003-052506 A | 2/2003 |
| JP | 2011-205991 A | 10/2011 |
| JP | 2012-125161 A | 7/2012 |
| JP | 2013-146229 A | 8/2013 |
| JP | 2018-514235 A | 6/2018 |
| KR | 10-0250160 B1 | 12/1999 |
| KR | 10-1336153 B1 | 12/2013 |
| KR | 10-1635799 B1 | 7/2016 |
| KR | 10-2016-0109661 A | 9/2016 |
| KR | 10-2017-0116207 A | 10/2017 |
| KR | 10-2018-0046623 A | 5/2018 |
| KR | 10-1856472 B1 | 5/2018 |

OTHER PUBLICATIONS

Office Action from CN Application No. 202080058663.2 dated Oct. 8, 2022.

Office Action of the corresponding Japanese Application No. 2022-505470. dated Apr. 25, 2023.

Extended European Search Report for Application No. 20870247.2 in 21 pages (Jul. 15, 2022).

Office Communication in EP Application No. 20 870 247.2 dated Jun. 6, 2024.

* cited by examiner

FIG. 12
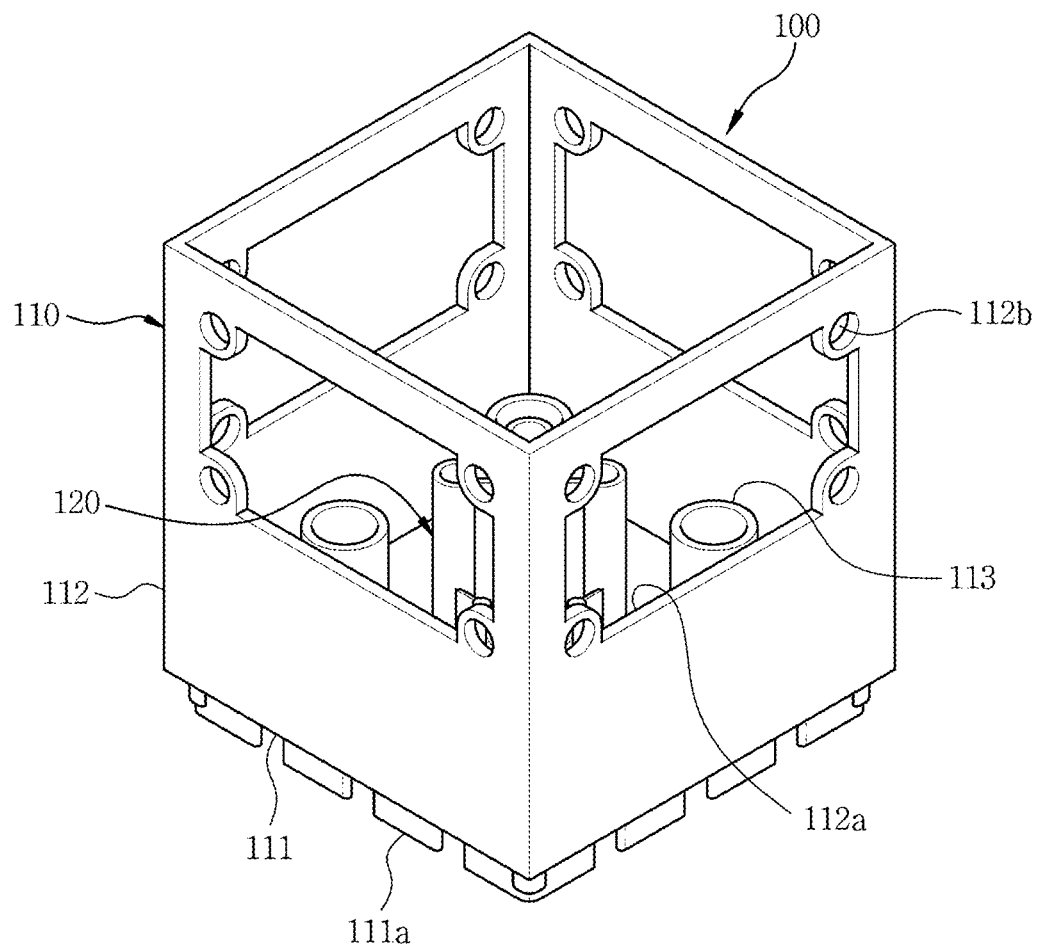
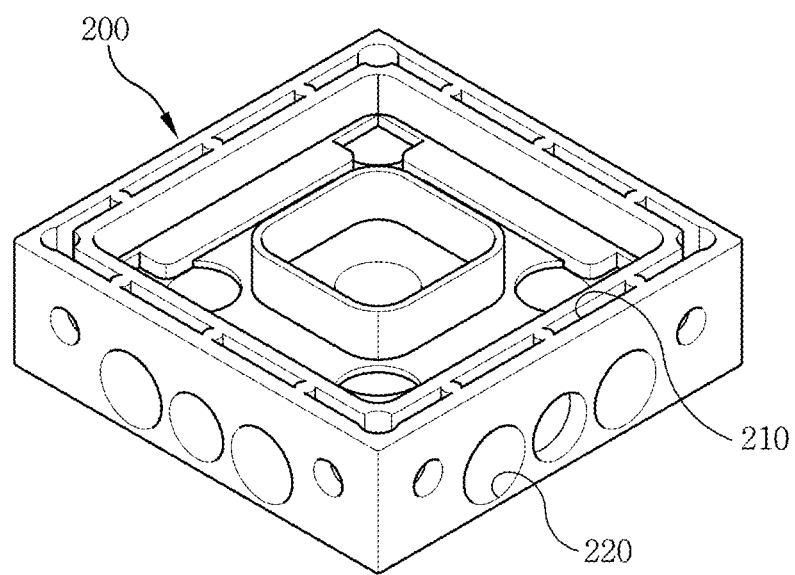

WATER CULTURE BLOCK

CROSS-REFERENCE TO RELATED APPLICATIONS

This application is a continuation application, and claims the benefit under 35 U.S.C. §§ 120 and 365 of PCT Application No. PCT/KR2020/012683, filed on Sep. 21, 2020, which claims priority to Korean Patent Applications Nos. 10-2019-0119695 filed on Sep. 27, 2019, and 10-2020-0120453 filed on Sep. 18, 2020, each of which is hereby incorporated by reference in its entirety.

BACKGROUND

Technical Field

The present disclosure relates to a water culture block and, more particularly, to a water culture block capable of growing aquatic plants.

Description of the Related Technology

In general, water culture refers to a cultivation method of growing plants in a culture medium containing water and water-soluble nutrients without using soil.

Because of growing plants suitable for hydroponics in a container filled with water or a culture medium, the water culture has advantages in that it is easy to observe the growth process of plants, the state of root development of plants, etc., and it is possible to grow plants easily and cleanly at home.

SUMMARY

An object of the present disclosure is to provide a water culture block capable of growing aquatic plants.

A water culture block according to the present disclosure includes a block body including a bottom plate and a plurality of side plates each formed perpendicular to the bottom plate and having an opening, and having an inner space formed therein, and an overflow partition zone formed perpendicular to the bottom plate in the inner space of the block body and accommodating a plurality of drain holes passing through the bottom plate, whereby evenly discharging a fluid overflowing in the block body into the plurality of drain holes.

In the water culture block according to the present disclosure, the bottom plate may have, on a lower surface thereof, a coupling portion to which a top portion of at least one other water culture block is coupled.

In the water culture block according to the present disclosure, the bottom plate may have, on a lower surface thereof, a plurality of drain passages each of which protrudes downward and has a hollow extending from the drain hole.

The water culture block according to the present disclosure may further include a plurality of drain pipe coupled to the plurality of drain passages, respectively, and distributing the overflowing fluid to at least one other water culture block.

The water culture block according to the present disclosure may further include a cover plate that covers at least one of the plurality of side plates.

In the water culture block according to the present disclosure, the cover plate may have a plurality of front protrusions uniformly disposed on a front surface thereof.

The water culture block according to the present disclosure may further include a plurality of image blocks selectively attached to the plurality of front protrusions.

In the water culture block according to the present disclosure, the overflow partition zone may include partition walls and anti-interference parts, the anti-interference parts being spaced apart from each other at an interval and extending upward from the partition walls so as to prevent interference between fluids overflowing through the adjacent partition walls.

The water culture block according to the present disclosure may further include an auxiliary drain pipe collecting the fluid drained from the plurality of drain passages and discharging the fluid into one tube.

The water culture block according to an embodiment of the present disclosure can provide an environment in which aquatic plants can grow, and can make a water culture easier and cleaner. Also, the water culture block can be implemented in a three-dimensional structure through multi-stage block stacking, can be applied to the wall and used as an art wall, and can allow plants to be individually provided to the respective stacked blocks.

In addition, the water culture block according to an embodiment of the present disclosure includes the overflow partition zone accommodating the plurality of drain holes formed in the bottom plate, so that the fluid overflowing from the inner space can be discharged evenly through the drain holes.

In addition, the water culture block according to an embodiment of the present disclosure includes the cover plate coupled to the side surface of the block body, and the image blocks being attachable to the cover plate, so that the user can freely design letters, logos, pictures, etc. on the cover plate to give beauty along with the plants.

BRIEF DESCRIPTION OF THE DRAWINGS

FIG. 12 is a perspective view showing a state in which a water culture block and a pedestal are provided to be coupled according to an embodiment of the present disclosure.

DETAILED DESCRIPTION

Korean Patent Registration No. 10-0250160 entitled "Device for hydroponic culture and purification using aquarium fish tank" discloses a water culture.

The above hydroponic culture and purification device using an aquarium fish tank not only provides water from the aquarium fish tank to a cultivation tank by means of an underwater pump so that plants can be grown hydroponically, but also provides again water in the cultivation tank to the aquarium fish tank through a filter, thus allowing both air purification and indoor humidification.

The above hydroponic culture and purification device using the aquarium fish tank can prevent plant sagging by supporting a plant through a plant support and also extending the plant support along with the growth of the plant.

However, the above hydroponic culture and purification device using the aquarium fish tank is not suitable for use as an artwall for decorating the wall of a living room or bedroom and is difficult to grow independently different plants stacked in layers.

In the following, only parts necessary for understanding embodiments of the present disclosure will be described, and descriptions of other parts will be omitted in the scope not disturbing the subject matter of the present disclosure.

The terms and words used herein should not be construed as limited to ordinary or dictionary definition, and should be construed in light of the meanings and concepts consistent with the subject matter of the present disclosure on the basis of the principle that the inventor can properly define his own invention as the concept of the term to describe it in the best way. It is therefore to be understood that embodiments disclosed herein are merely exemplary and various equivalents or modifications thereof are possible.

Hereinafter, the present disclosure will be described in detail with reference to the accompanying drawings.

Figure 1:
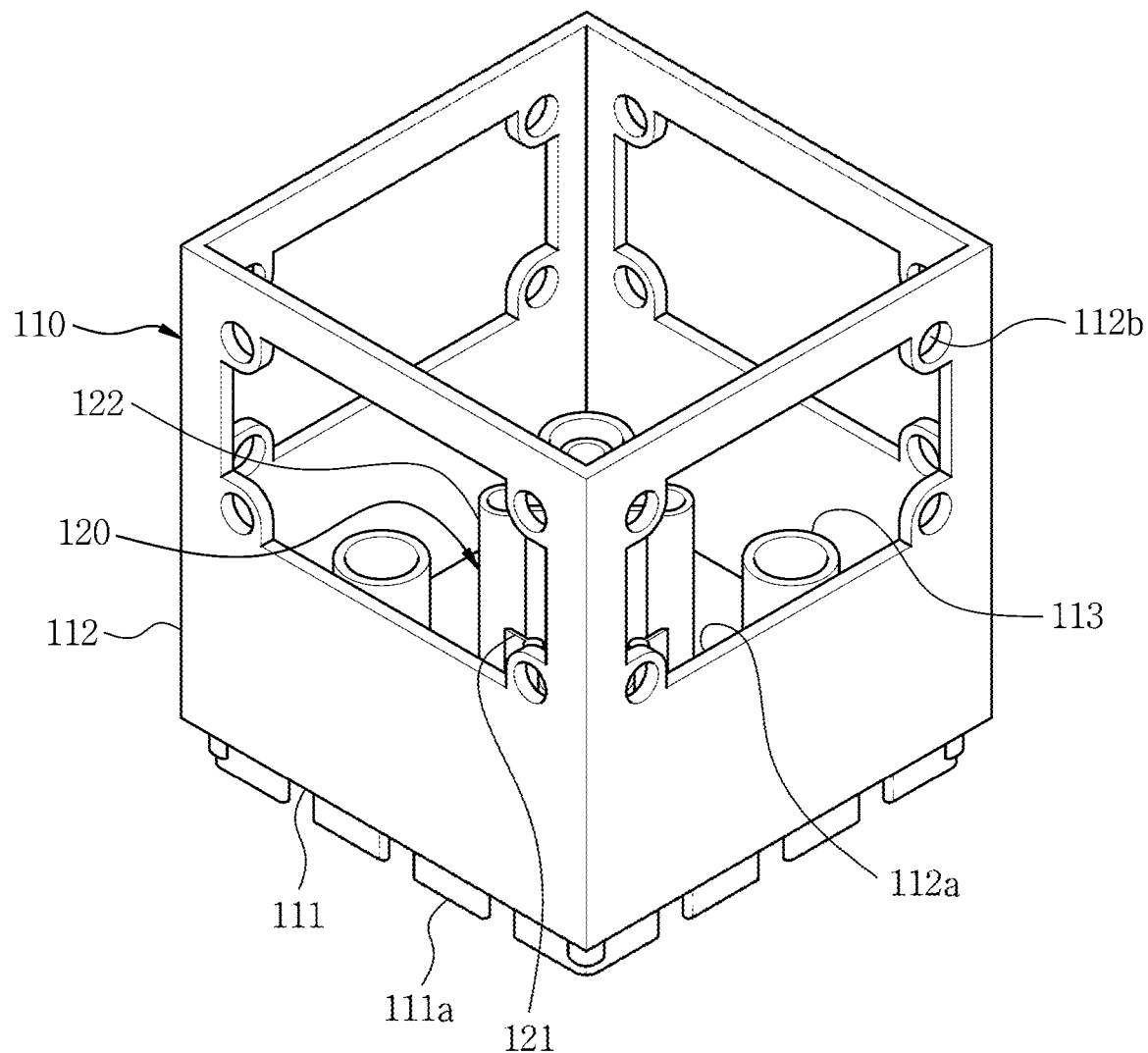
FIG. 1 is a perspective view showing a water culture block according to an embodiment of the present disclosure.
Figure 2:
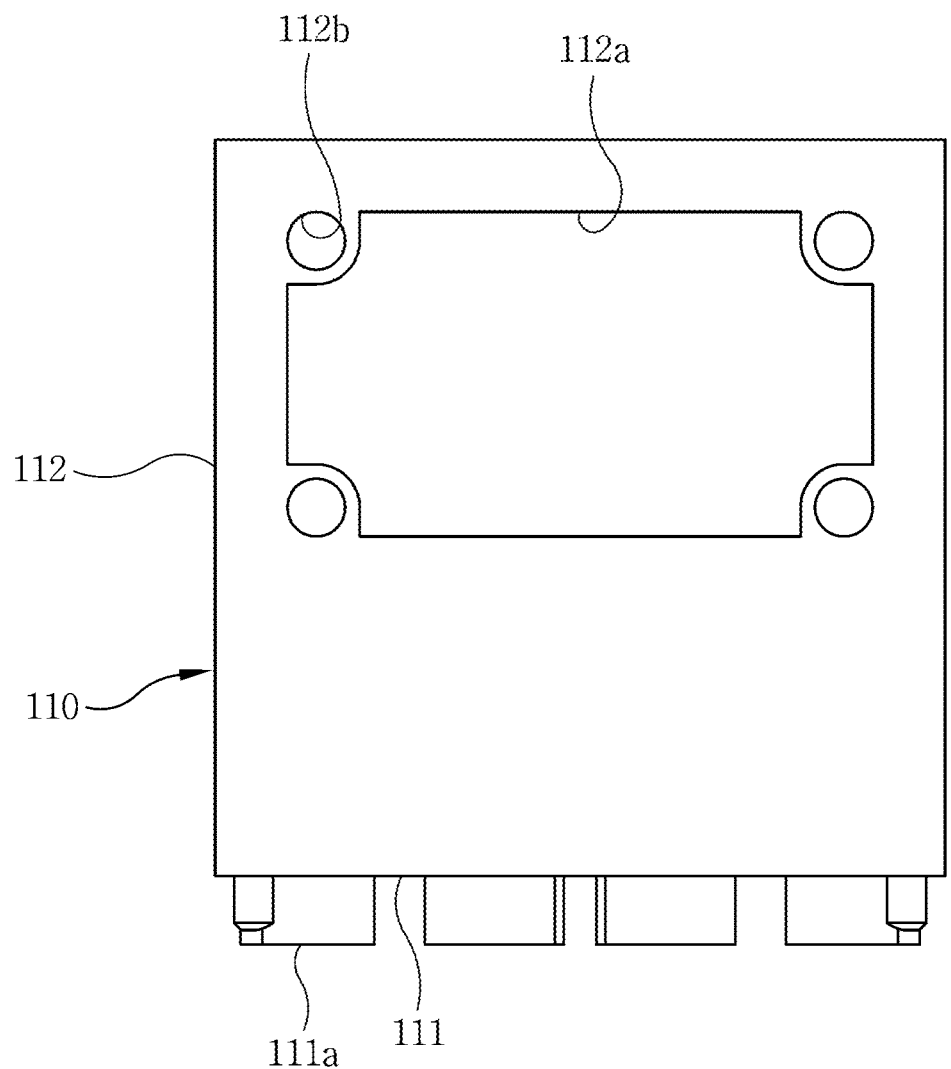
FIG. 2 is a front view showing a water culture block according to an embodiment of the present disclosure.
Figure 3:
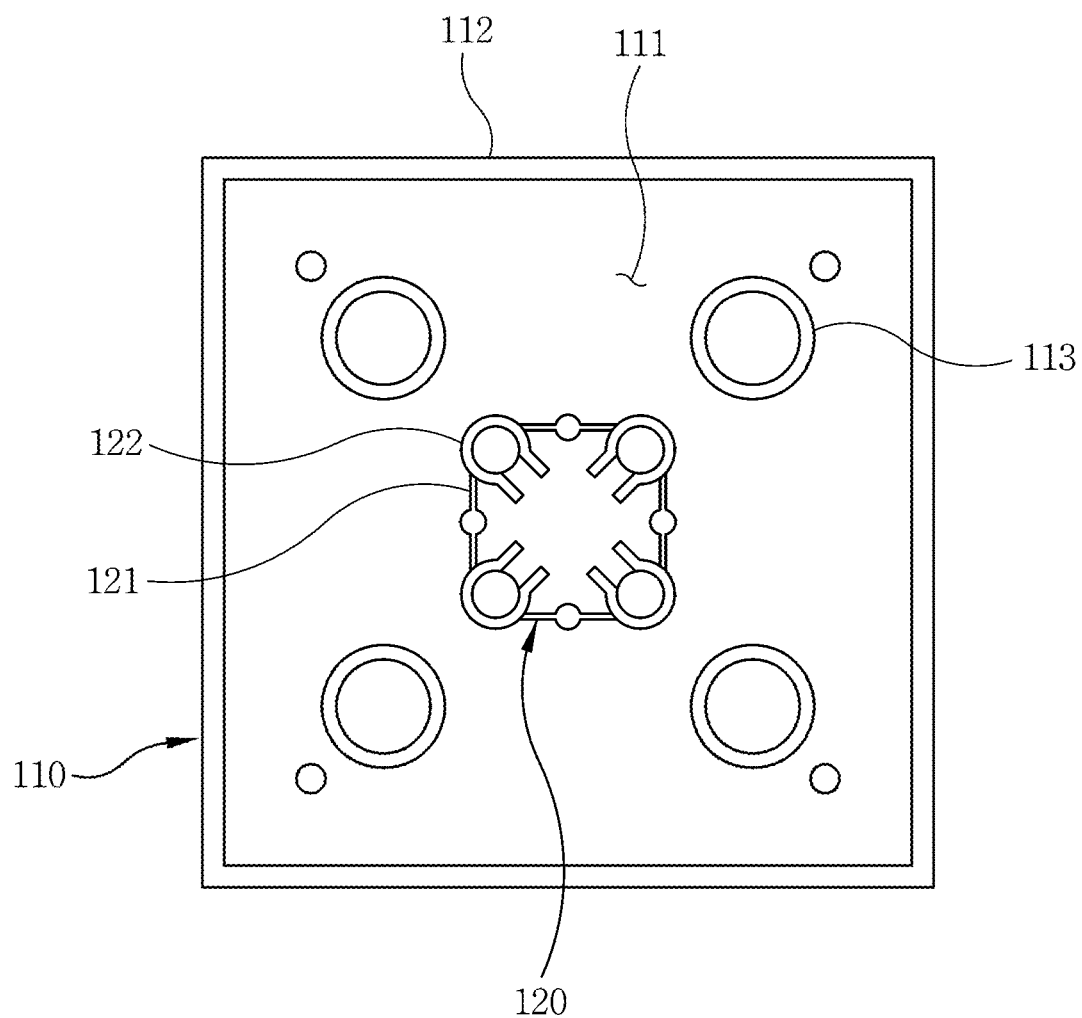
FIG. 3 is a plan view showing a water culture block according to an embodiment of the present disclosure.
Figure 4:
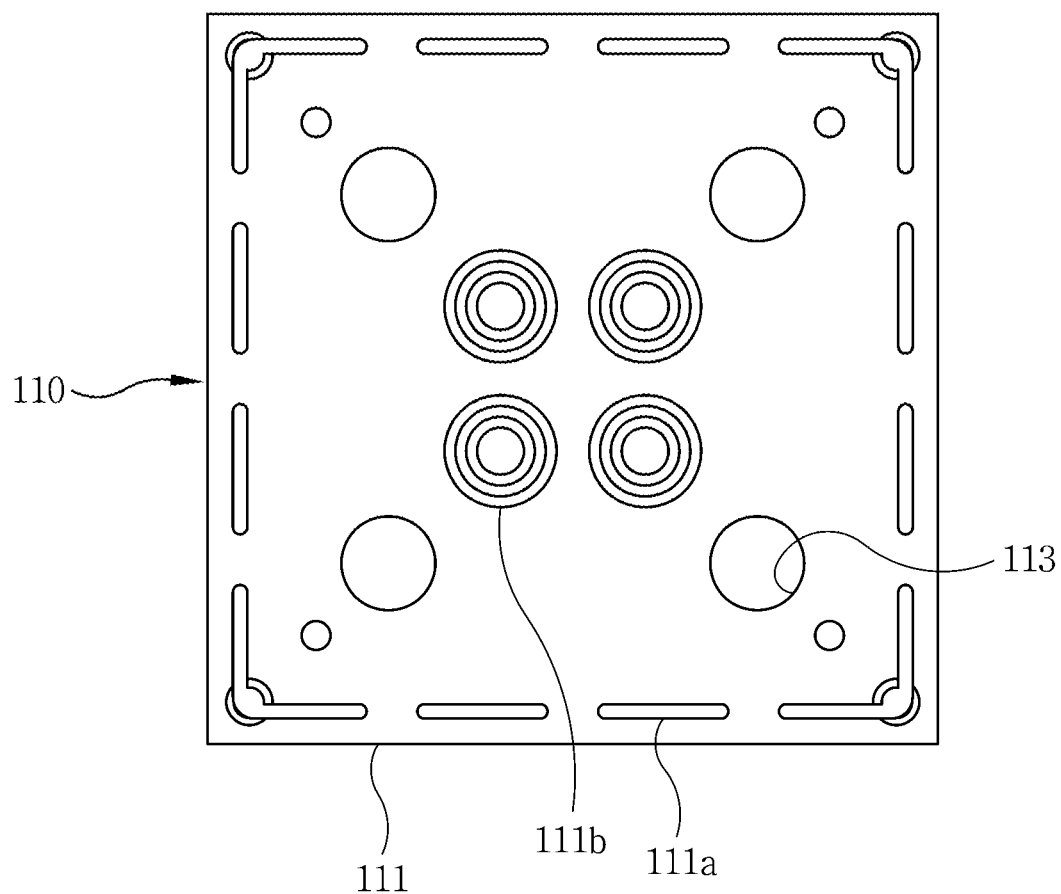
FIG. 4 is a bottom view showing a water culture block according to an embodiment of the present disclosure.
Figure 5:
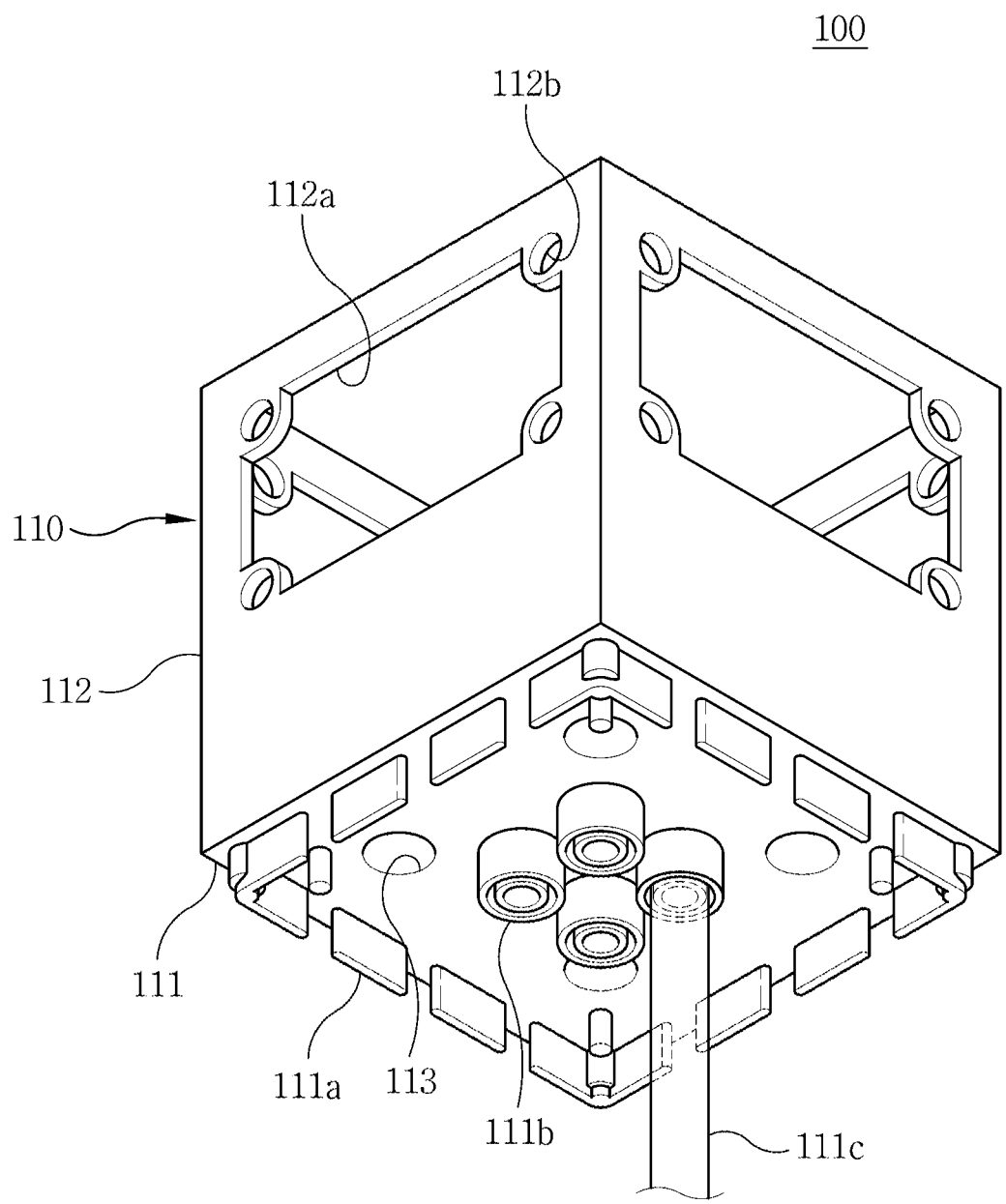
FIG. 5 is a bottom perspective view showing a water culture block according to an embodiment of the present disclosure.

FIG. 1 is a perspective view showing a water culture block according to an embodiment of the present disclosure. FIG. 2 is a front view showing a water culture block according to an embodiment of the present disclosure. FIG. 3 is a plan view showing a water culture block according to an embodiment of the present disclosure. FIG. 4 is a bottom view showing a water culture block according to an embodiment of the present disclosure. FIG. 5 is a bottom perspective view showing a water culture block according to an embodiment of the present disclosure.

Referring to FIGS. 1 to 5, a water culture block 100 includes a block body 110 and an overflow partition zone 120.

The block body 110 may have a three-dimensional structure in which an inner space is formed and a top portion is opened. A fluid is provided in the inner space of the block body 110, and plants can grow in the fluid. The fluid may be water, a culture solution, or the like. The block body 110 may be made of, but is not limited to, a synthetic resin material. Alternatively, the block body 110 may be made of a metallic material that has high durability and is not easily corroded.

The block body 110 may be manufactured by assembling several pieces produced individually. Alternatively, the block body 110 may be manufactured integrally through an injection process or by folding and welding metal plates.

In addition, the block body 110 may be waterproofed to prevent leakage of water or culture solution filled in the inner space.

The block body 110 according to an embodiment of the present disclosure has a hexahedral structure formed of a plurality of side plates 112, one bottom plate 111, and an open top.

For example, the block body 110 has four side plates 112 and one bottom plate 111.

For constituting the block body 110, the four side plates 112 and the one bottom plate 111 may be mutually assembled or integrally formed.

Each of the plurality of side plates 112 has an opening 112a formed therein. Through the opening 112a, a plant may be provided into the block body 110, or a part of the plant may be discharged to the outside of the block body 110.

In an embodiment of the present disclosure, the opening 112a may be formed in an upper portion of the side plate 112, and a lower end of the opening 112 is positioned so as to be suitable for filling the block body 110 with water or culture solution.

In the side plate 112, through-holes 112b are formed at respective corners of the opening 112a. The through-holes 112b formed in the side plates 112 face each other.

The through-holes 112b are used in fixing the block body 110 to the wall through a fixing member or used in coupling a cover plate 140 to be described later. In addition, the through-holes 112b are used in coupling between adjacent block bodies through a separate coupling member.

The bottom plate 111 is a plate forming the bottom of the block body 110, and a lower surface thereof may have a coupling portion 111a to which a top portion of at least one other water culture block is coupled or a pedestal 200 is coupled.

In a central portion of the bottom plate 111, a plurality of drain holes may be formed.

The plurality of drain holes may be positioned in an inside region of an overflow partition zone 120 to be described later. The plurality of drain holes penetrate the bottom plate 111 and drain the fluid of the inner space overflowing into the overflow partition zone 120 to the outside.

In addition, on the lower surface of the bottom plate 111, a plurality of drain passages 111b each of which protrudes downward and has a hollow extending from the above-mentioned drain hole may be formed. The drain passages 111b may be formed to correspond to the plurality of drain holes, respectively, and drain pipes 111c may be coupled thereto.

The drain pipes 111c are coupled to the plurality of drain passages, respectively, and distribute the fluid overflowing from the inner space to at least one other water culture block or a water tank 300. The drain pipe 111c may be formed in various lengths. For example, the drain pipe 111c may be configured in various forms such as being connected to an inner space of another water culture block located directly below or being connected to an inner space of another water culture block disposed in a diagonally downward direction.

In addition, at least one supply passage 113 may be formed from the bottom plate 111. The supply passage 113 is formed higher than the fluid filled in the inner space and penetrates the bottom plate 111 to provide a space for arranging a reverse pipe (320 in FIG. 14). In order to prevent the fluid from flowing in, the supply passage 113 may be formed to be higher than overflow partition walls 121. As such, by forming the supply passage 113 penetrating the bottom plate 111 to accommodate the reverse pipe, it is possible to easily stack and variously configure a plurality of water culture blocks 100. The reverse pipe 320 means a pipe for transferring the fluid from the water tank 300 located at the lowermost to the water culture block 110 located at the uppermost.

The overflow partition zone 120 is formed perpendicularly to the bottom plate 111 in the inner space of the block body 110 and contains all the plurality of drain holes formed in the bottom plate 111 so as to evenly drain the fluid overflowing from the block body 110 through the plurality of drain holes. That is, the plurality of drain holes may be positioned in the inner region of the overflow partition zone 120.

The overflow partition zone 120 may include a plurality of partition walls 121 and anti-interference parts 122. The plurality of partition walls 121 allow the fluid filled in the inner space to overflow and be evenly drained into the plurality of drain holes, so that the fluid in the inner space is prevented from overflowing into the opening 112a of the block body 110.

If the overflow partition zone 120 for draining the fluid in the inner space into the plurality of drain holes is formed in the form of tubes respectively extending from the plurality of drain holes, there arises a problem that the overflowed fluid is drained through only some holes due to the tilt of the block body 110 or the like.

In an embodiment of the present disclosure, the fluid overflowing through the plurality of partition walls 121 can be uniformly drained into the plurality of drain holes. The anti-interference parts 122 are spaced apart from each other at a certain interval and extend upward from the partition walls 121 to prevent interference between fluids overflowing through the adjacent partition walls 121. In addition, the anti-interference parts 122 can prevent a root of a plant planted in the inner space from blocking the partition wall 121 while growing or from interfering with the plurality of holes formed in the bottom plate 111 to disturb the flow of the fluid.

Figure 6:
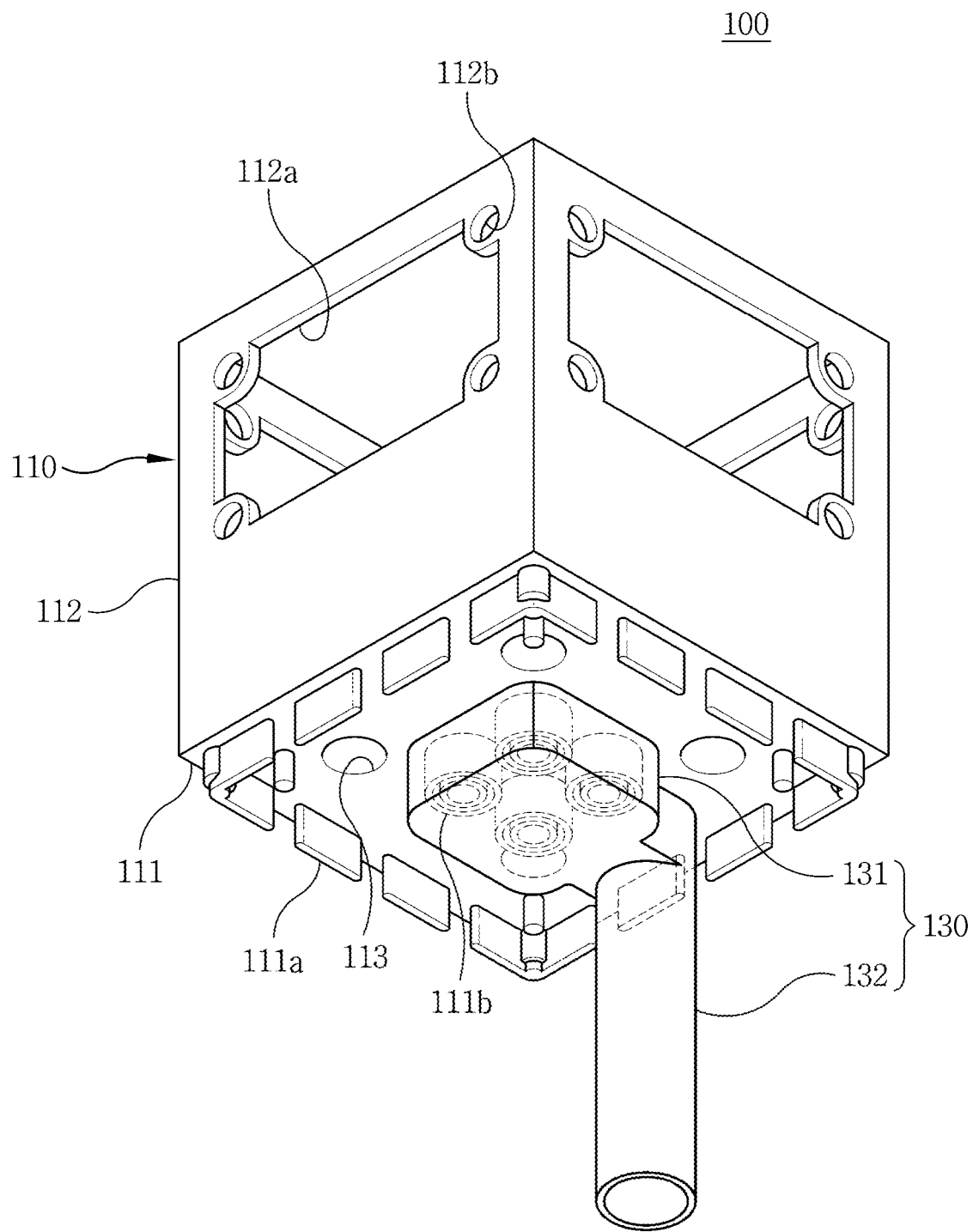
FIG. 6 is a bottom perspective view showing a state in which an auxiliary drain pipe is coupled to a water culture block according to an embodiment of the present disclosure.

FIG. 6 is a bottom perspective view showing a state in which an auxiliary drain pipe is coupled to a water culture block according to an embodiment of the present disclosure.

According to an embodiment of the present disclosure, the water culture block 100 may further include an auxiliary drain pipe 130. The auxiliary drain pipe 130 collects the fluids drained from the plurality of drain passages 111b and discharges them into one tube.

That is, the auxiliary drain pipe 130 may be composed of a collection part 131 for collecting the fluids drained from the plurality of drain passages 111b, and a drain tube 132 extending from the collection part 131 and delivering the collected fluids to the inner space of another water culture block located thereunder. This configuration makes it possible to easily transfer the fluid to such underlying another water culture block even without using the drain pipe 111c suitable for each drain passage 111b.

Figure 7:
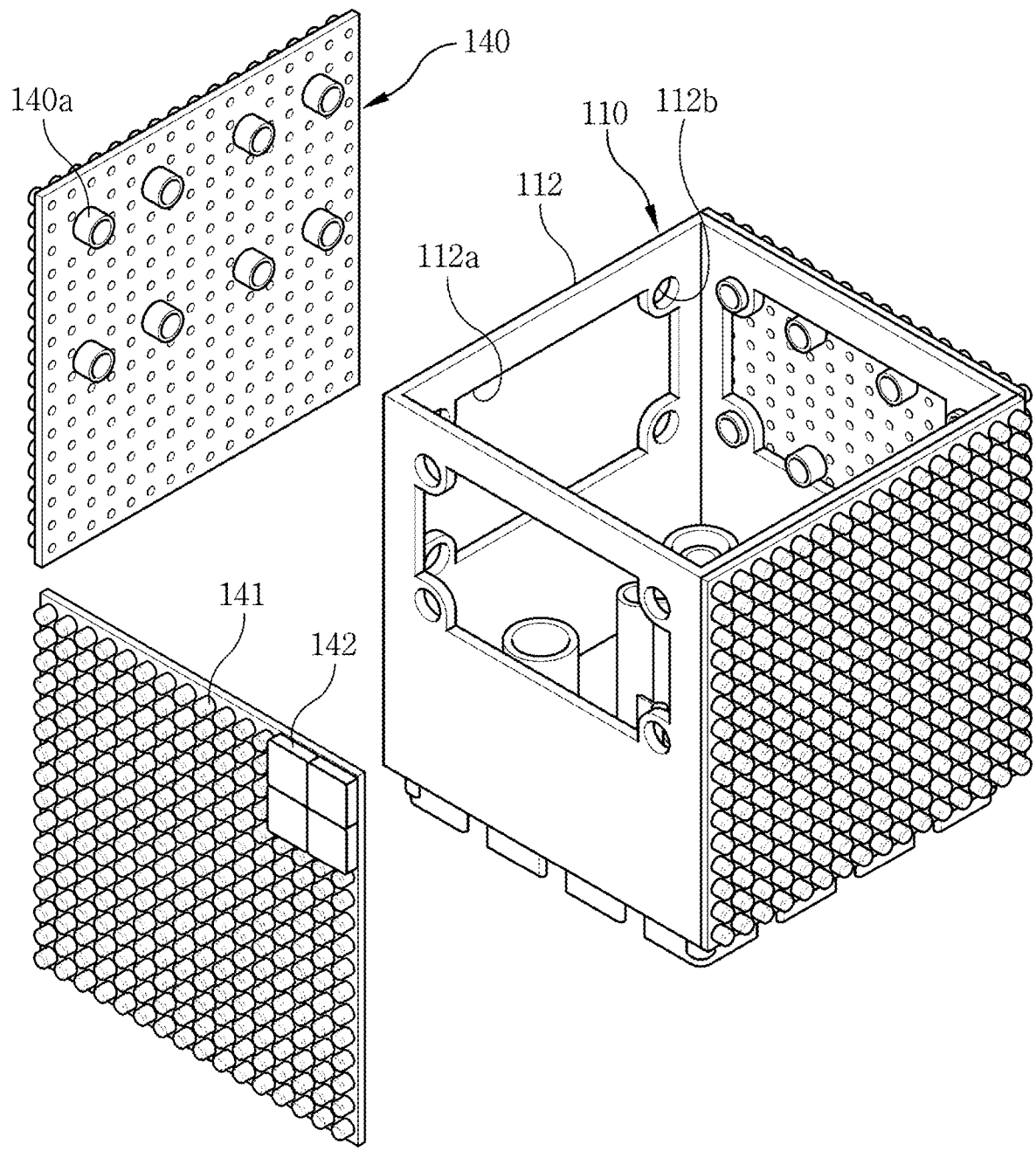
FIG. 7 is a perspective view showing a state in which a cover plate is coupled to a water culture block according to an embodiment of the present disclosure.

FIG. 7 is a perspective view showing a state in which a cover plate is coupled to a water culture block according to an embodiment of the present disclosure.

Referring to FIG. 7, the water culture block 100 according to an embodiment of the present disclosure may further include a cover plate 140 that covers at least one of the plurality of side plates 112.

The cover plate 140 may be coupled to cover all of the side plates 112. In case that different water culture blocks are adjacent to and coupled to each other, the cover plate 140 may be coupled to be positioned in a middle portion of two side plates of such adjacent water culture blocks. The cover plate 140 may have rear protrusions 140a formed on a rear surface thereof to be inserted into the through-holes 112b of the block body 110.

In addition, the cover plate 140 may have a plurality of front protrusions 141 uniformly disposed on a front surface thereof. The front protrusions 141 allow image blocks 142 to be selectively attached thereto. The image block 142 may have on a rear surface thereof at least one groove into which at least one front protrusion 141 can be inserted. As the plurality of front protrusions 141 are uniformly formed, the image blocks 142 may be freely arranged to implement a desired picture, letter, logo, or the like.

Figure 8:
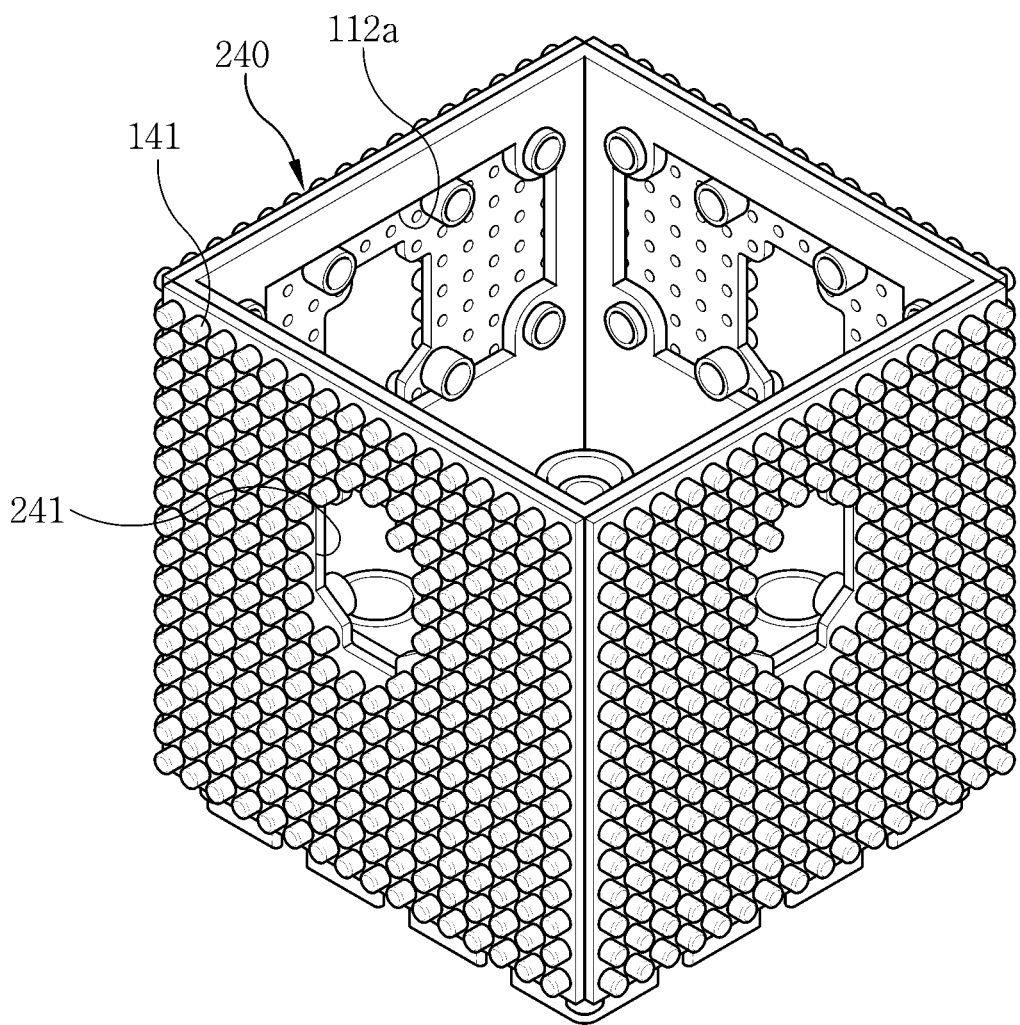
FIG. 8 is a perspective view showing a cover plate according to another embodiment of the present disclosure.

FIG. 8 is a perspective view showing a cover plate according to another embodiment of the present disclosure.

As shown in FIG. 8, a cover plate 240 according to another embodiment of the present disclosure may have an exposure hole 241 that partially exposes the opening 112a of the side plate 112. The exposure hole 241 allows a part of the plant growing in the inner space to be exposed. The user can freely use this cover plate 240 along with the above-described cover plate 140 according to an embodiment of the present disclosure.

Figure 9:
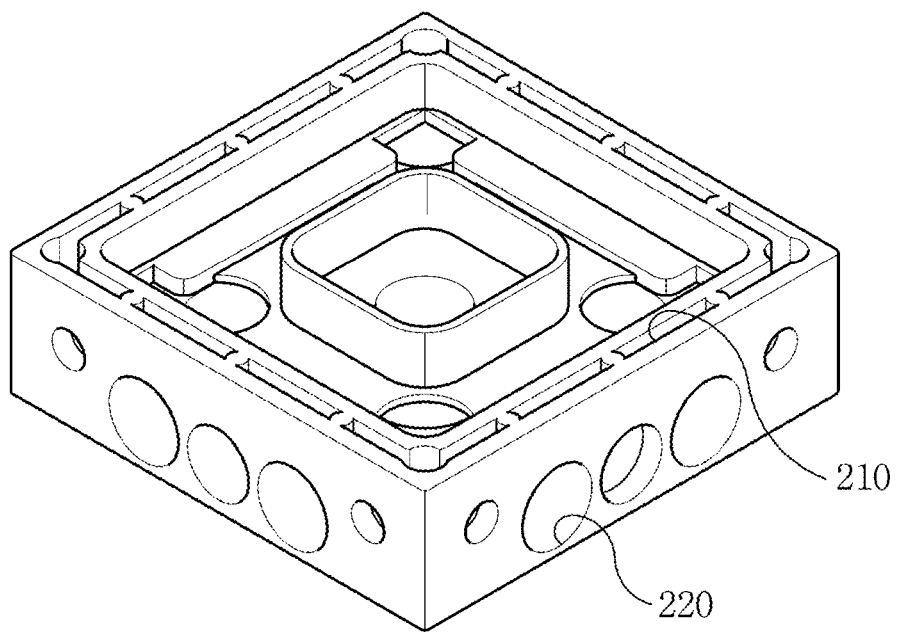
FIG. 9 is a perspective view showing a pedestal according to an embodiment of the present disclosure.
Figure 10:
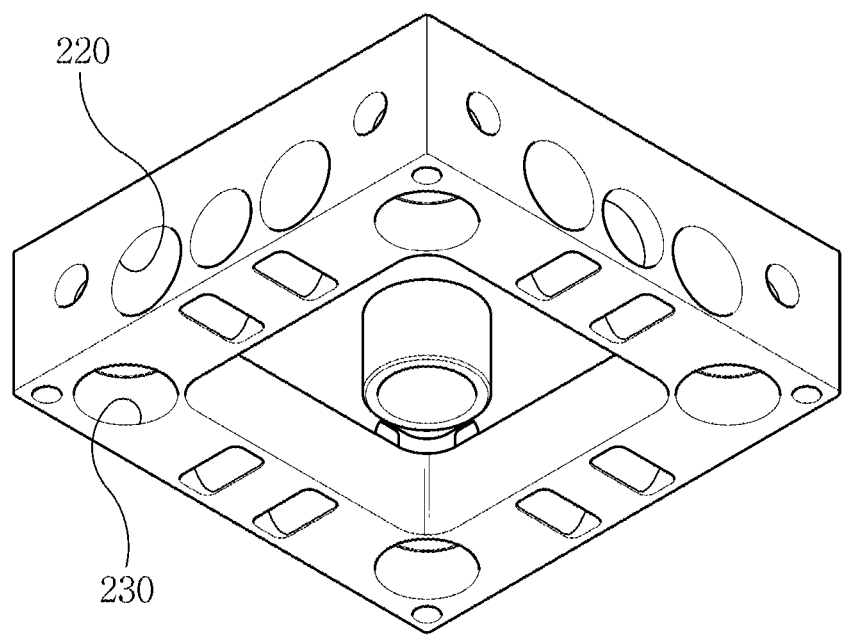
FIG. 10 is a bottom perspective view showing a pedestal according to an embodiment of the present disclosure.
Figure 11A:
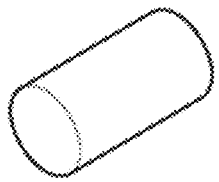
FIGS. 11A and 11B are perspective views showing a connector according to an embodiment of the present disclosure.
Figure 11B:
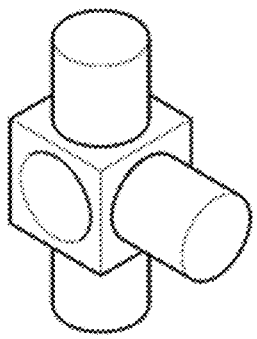

FIG. 9 is a perspective view showing a pedestal according to an embodiment of the present disclosure. FIG. 10 is a bottom perspective view showing a pedestal according to an embodiment of the present disclosure. FIG. 11A and FIG. 11B are perspective views showing a connector according to an embodiment of the present disclosure. FIG. 12 is a perspective view showing a state in which a water culture block and a pedestal are provided to be coupled according to an embodiment of the present disclosure.

Referring to FIGS. 9 to 12, the pedestal 200 is coupled to a lower surface of the block body 110 and forms a space in which the water tank 300 is disposed. The pedestal 200 has a first coupling groove 210 formed on an upper surface thereof to correspond to and engaged with the coupling portion 111a formed on a lower surface of the bottom plate 111 of the block body 110.

In addition, the pedestal 200 may have at least one second coupling groove 220 and at least one third coupling groove 230 respectively formed on a side surface and a bottom surface thereof. The second coupling groove 220 and the third coupling groove 230 may be coupled to another pedestal through connectors shown in FIG. 11A and FIG. 11B.

The connectors shown in FIG. 11A and FIG. 11B may be configured in various forms and appropriately connected to the second coupling grooves 220 or the third coupling grooves 230 depending on the arrangement of the pedestal 200.

Figure 13:
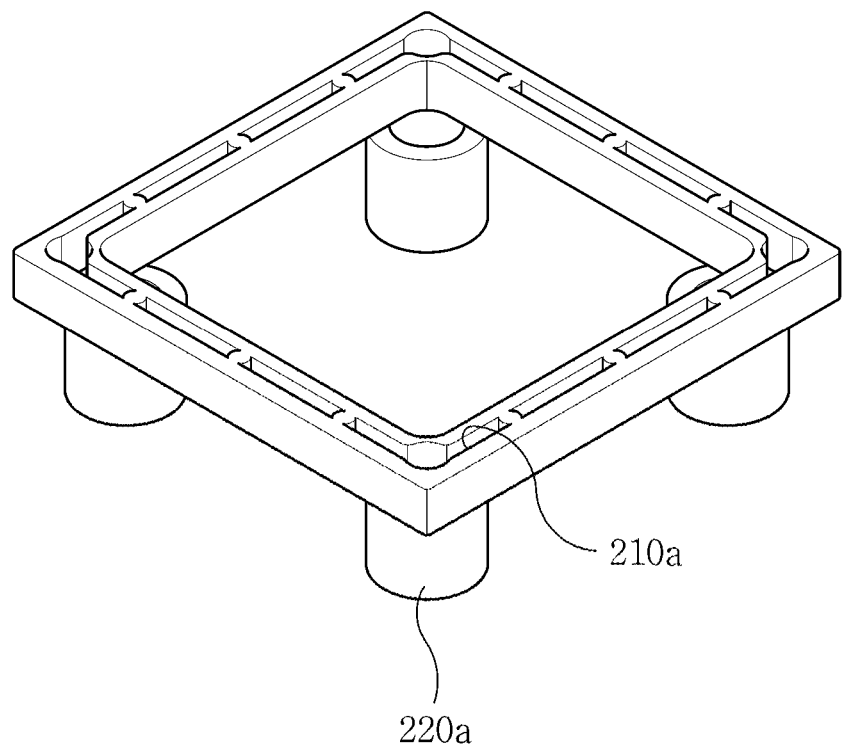
FIG. 13 is a perspective view showing a pedestal according to another embodiment of the present disclosure.

FIG. 13 is a perspective view showing a pedestal according to another embodiment of the present disclosure.

Referring to FIG. 13, the pedestal 200a according to another embodiment of the present disclosure may have a fourth coupling groove 210a formed on its upper surface and coupled to the coupling portion 111a of the block body 100, and also have a support pillar 220a formed at each corner of its lower surface. The pedestal 200a according to another embodiment of the present disclosure may be used alone for one water culture block 100 or, depending on the length of the support pillar 220a, combined with the water culture block 100 located at the lowermost to provide a space where the water tank 300 is disposed.

Figure 14:
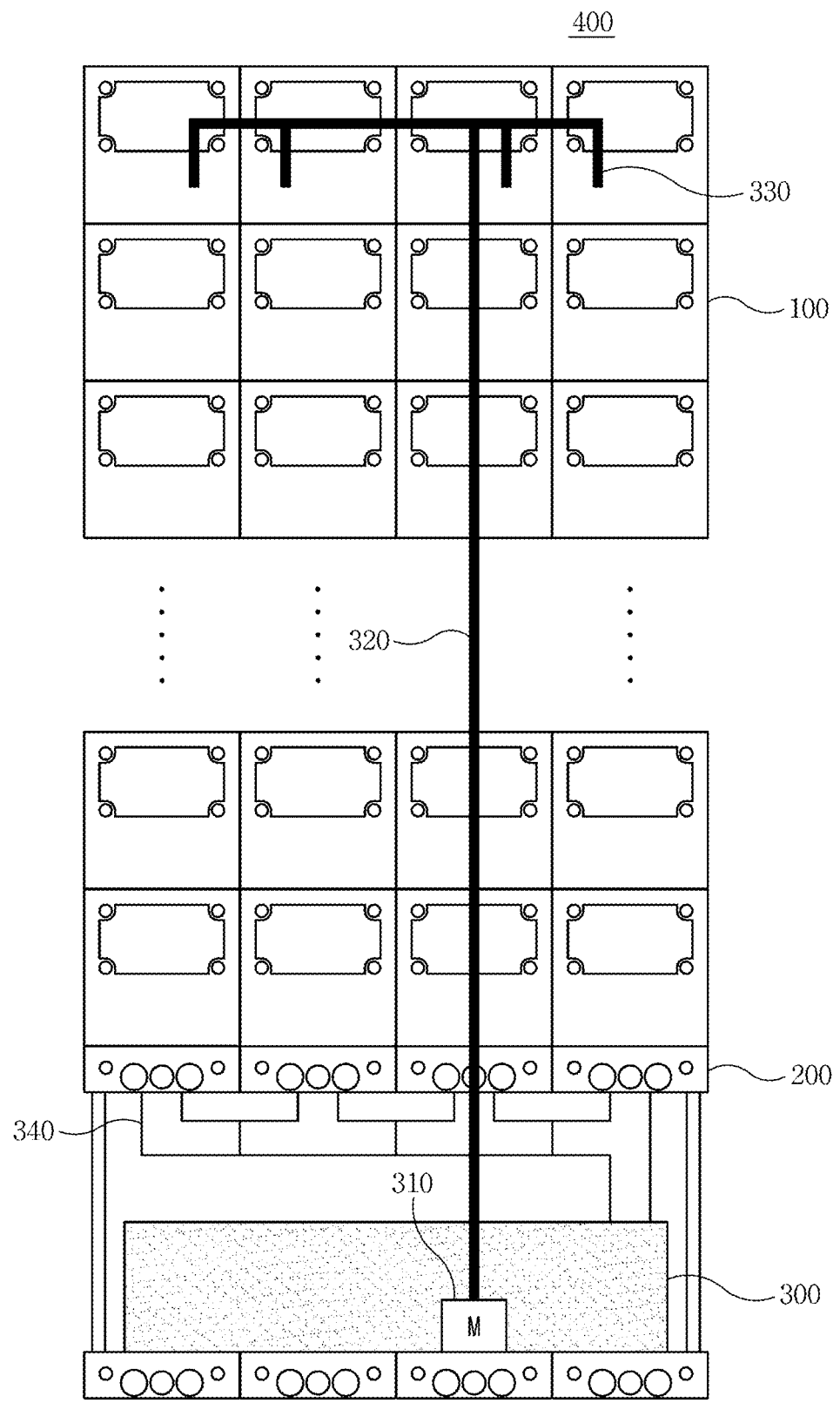
FIG. 14 is a view showing a water culture apparatus according to an embodiment of the present disclosure.

FIG. 14 is a view showing a water culture apparatus according to an embodiment of the present disclosure.

Referring to FIG. 14, the water culture apparatus 400 according to an embodiment of the present disclosure may include the water culture block 100, the pedestal 200, and the water tank 300. Although the drawing illustrates the water culture blocks 100 arranged in four rows and vertically stacked on the pedestal 200, the present disclosure is not limited thereto. The water culture blocks 100 may be configured in various shapes such as a pyramid-like stack with a reduced number toward the top, a zigzag-like stack, or a stack with an empty center.

The fluid contained in the water tank 300 may be delivered to one of the water culture blocks 100 located at the uppermost along a reverse pipe 320 by a motor 310, and then distributed to the uppermost water culture blocks 100 through a first auxiliary pipe 330.

The fluid supplied to the inner space of the uppermost water culture block 100 is transferred to underlying water culture block(s) via the overflow partition zone 120 and the bottom plate as described above. For example, the fluid may be delivered to a directly underlying water culture block through the auxiliary drain pipe 130, or the fluid may be delivered to a diagonally underlying water culture block through the drain pipe (111c in FIG. 5). In addition, the fluid may be delivered to the water tank 300 through a second auxiliary pipe 340 from the lowermost water culture block. Here, the first auxiliary tube may be formed in various shapes such as a " ⌐ " shape, a " ⌐ " shape, and a " — " shape, and it may be configured in a connectable form for extension.

Figure 15:
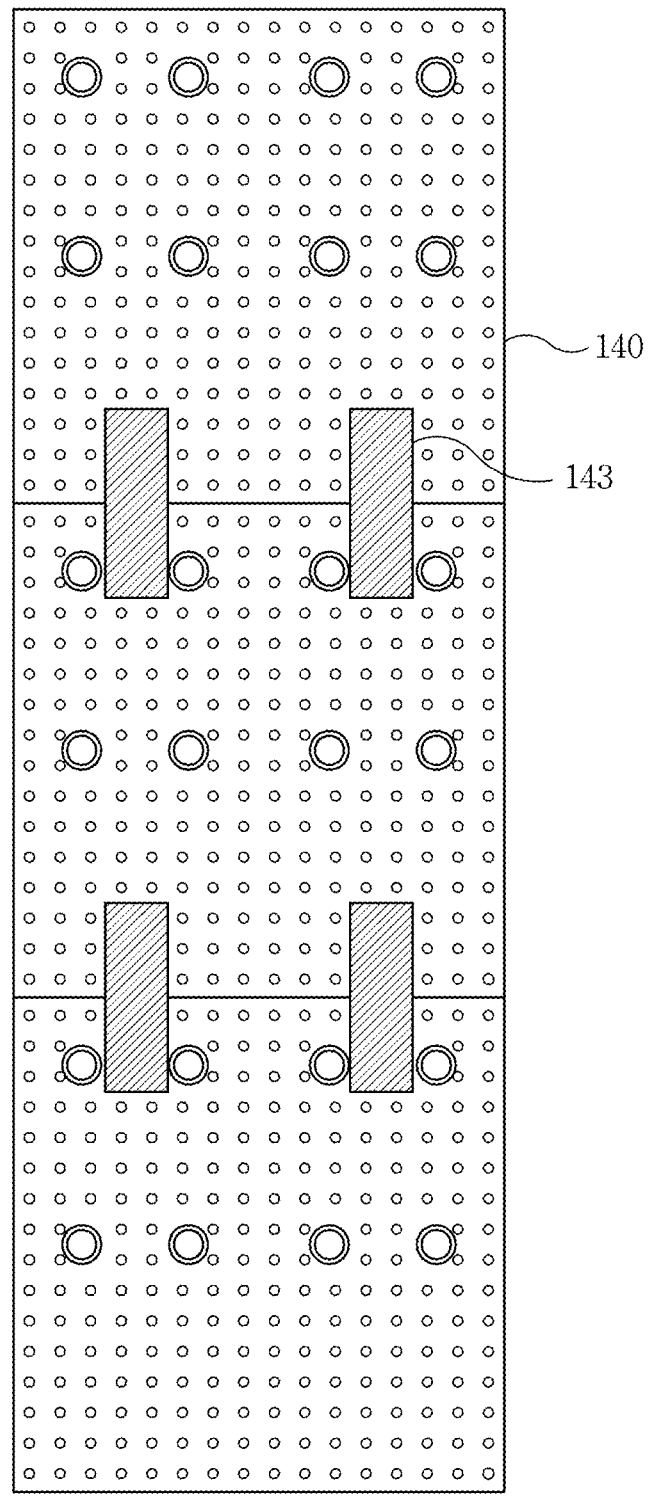
FIG. 15, FIG. 16A, FIG. 16B, and FIG. 17 are views showing examples of applying a cover plate according to embodiments of the present disclosure.
Figure 16A:
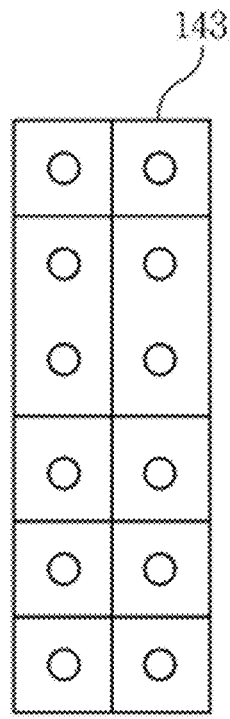
Figure 16B:
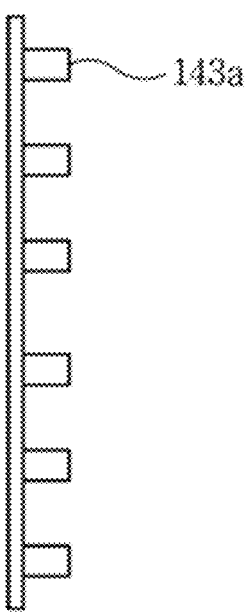
Figure 17:
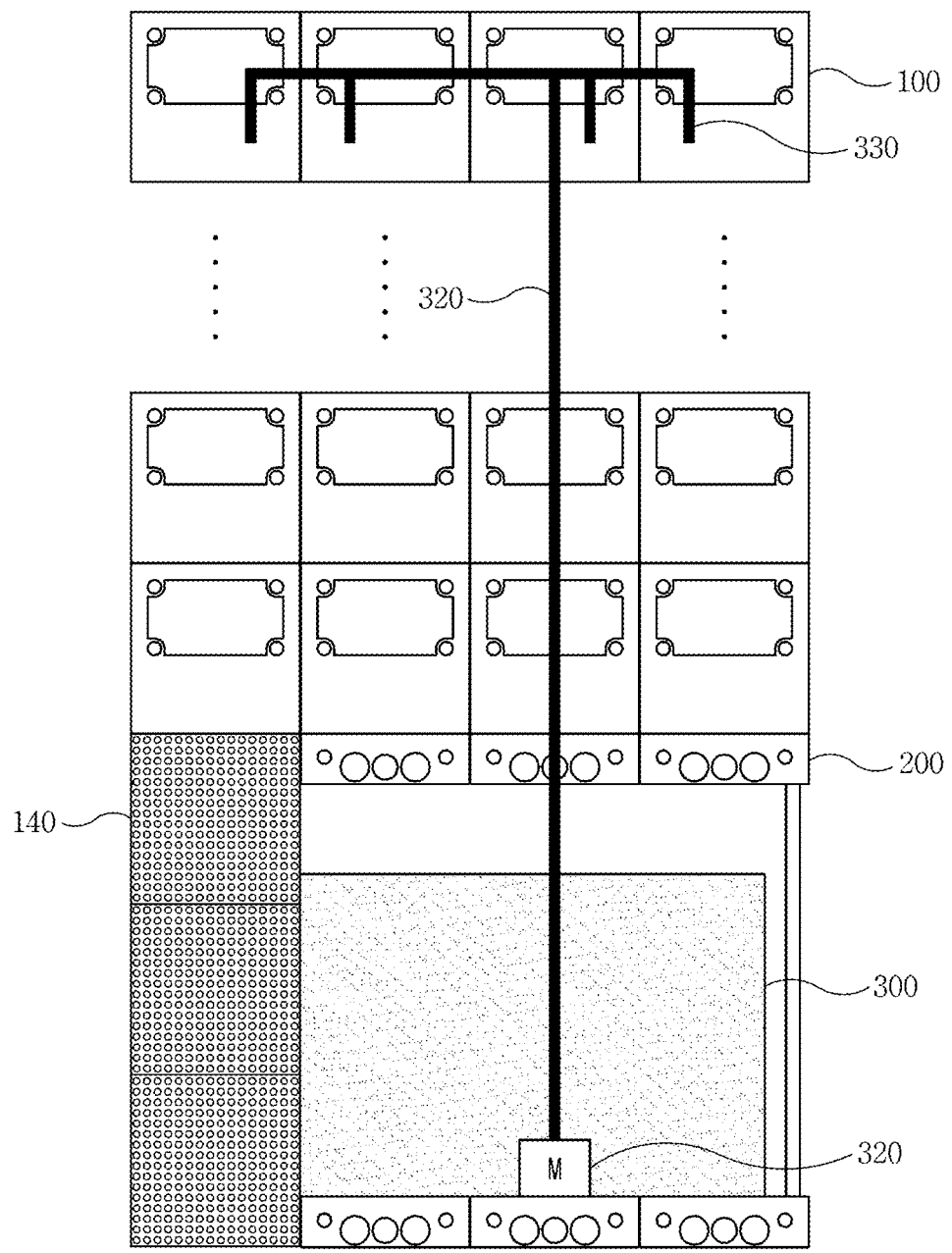

FIGS. 15 to 17 are views showing examples of applying a cover plate according to embodiments of the present disclosure. Meanwhile, in FIG. 16, (a) shows the front of a connecting member, and (b) shows the side of the connecting member.

Referring to FIGS. 15 to 17, the cover plate 140 according to an embodiment of the present disclosure is coupled to the pedestal 200 and may be used to cover the water tank 300 as shown in FIG. 17 and also used for additional design. The size and shape of the cover plate 140 may be formed variously.

As shown in FIG. 15, two adjacent cover plates 140 may be coupled to each other by a connecting member 143. As shown in FIG. 16A and FIG. 16B, the connecting member 143 may have protrusions 143a formed on its front surface at regular intervals.

These protrusions 143a may be formed in a shape corresponding to recesses formed on the rear surface of the cover plate 140 at regular intervals. These recesses formed on the rear surface of the cover plate 140 may be produced in a process of forming the front protrusions 141 on the front surface of the cover plate 140.

As such, by connecting the plurality of cover plates 140 to each other through the connecting member 143 and coupling them to the pedestal 120, the cover plates 140 can be used to cover a desired area as shown in FIG. 17.

In addition, by coupling the cover plate 140 to the water culture block 100 or the pedestal 200 and attaching the image blocks 143 to the cover plate 140, a desired image or text can be designed.

As described above, the water culture apparatus 400 according to an embodiment of the present disclosure can provide an environment in which aquatic plants can grow, and can make a water culture easier and cleaner. Also, the water culture apparatus 400 can be implemented in a three-dimensional structure through multi-stage block stacking, can be applied to the wall and used as an art wall, and can allow plants to be individually provided to the respective stacked blocks.

In addition, the water culture apparatus 400 according to an embodiment of the present disclosure includes the overflow partition zone 210 accommodating the plurality of drain holes formed in the bottom plate 111, so that the fluid overflowing from the inner space can be discharged evenly through the drain holes.

In addition, the water culture apparatus 400 according to an embodiment of the present disclosure includes the cover plate 140 coupled to the side surface of the block body, and the image blocks 141 being attachable to the cover plate 140, so that the user can freely design letters, logos, pictures, etc. on the cover plate 140 to give beauty along with the plants.

Figure 18:
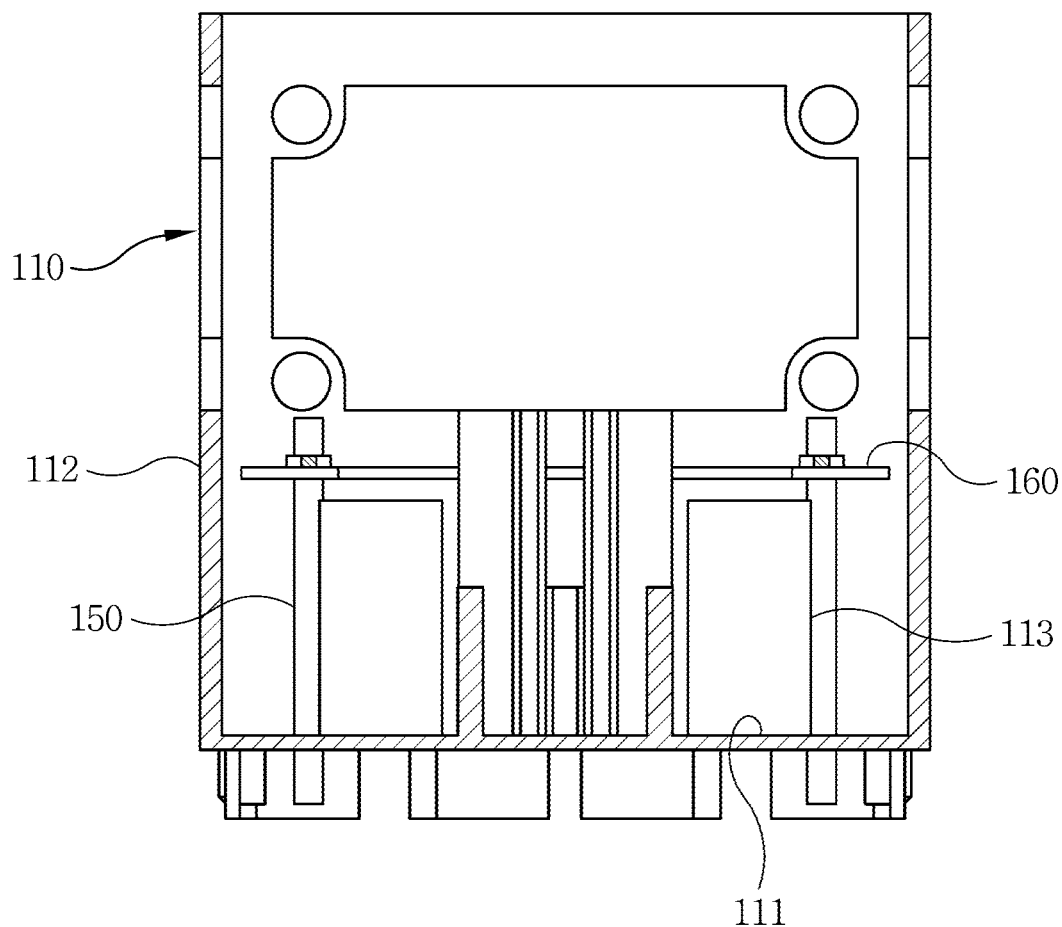
FIG. 18 is a side cross-sectional view showing a water culture block according to another embodiment of the present disclosure.
Figure 19:
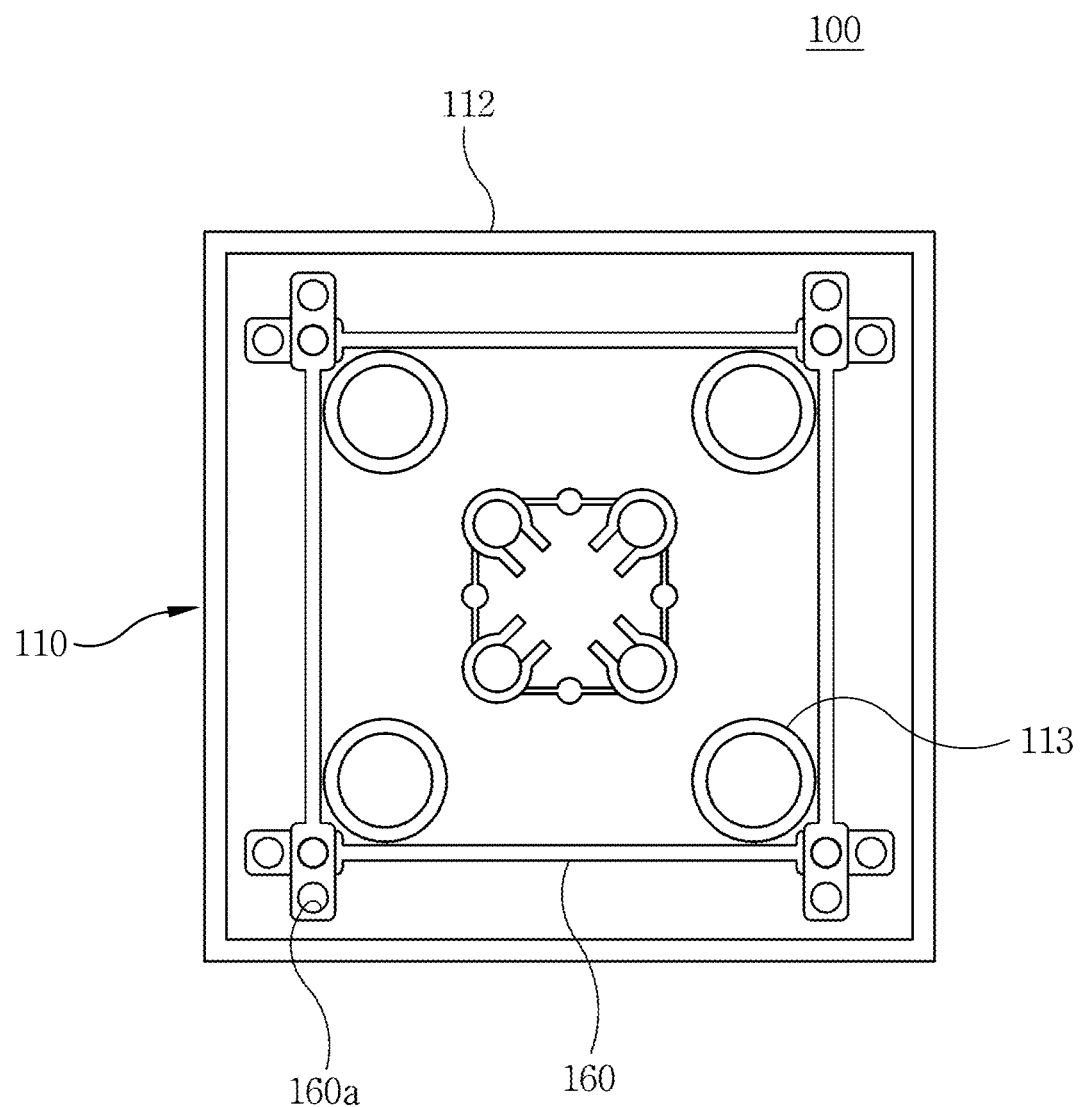
FIG. 19 is a plan view showing a water culture block according to another embodiment of the present disclosure.

FIG. 18 is a side cross-sectional view showing a water culture block according to another embodiment of the present disclosure. FIG. 19 is a plan view showing a water culture block according to another embodiment of the present disclosure.

Referring to FIGS. 18 and 19, the water culture block according to another embodiment of the present disclosure includes substantially the same elements as those of the water culture block according to the above-described embodiment of the present disclosure, except for a plant support rod 150 and a plant support bracket 160. The same reference numerals are assigned to the same elements.

Referring to FIGS. 18 and 19, the water culture block according to another embodiment of the present disclosure may include the plant support rod 150 formed to protrude from the bottom plate 111. The plant support rod 150 may have cylindrical shape and may be formed in plural at positions adjacent to respective corners of the bottom plate 111.

The plant support bracket 160 may have at least one hole 160a formed at both ends, and the plant support rod 150 may be inserted into and fixed to the hole 160a. The plant support bracket 160 may support a plant disposed in the inner space of the block body 110. The plant support bracket 160 may be formed of a material having elasticity, for example, rubber or silicone. The plant support bracket 160 may be fixed to the plant support rod 150 by an elastic force.

Meanwhile, the embodiments disclosed in the description and drawings are merely presented as specific examples to aid understanding and are not intended to limit the scope of the present disclosure. It is apparent to those of ordinary skill in the art to which the present disclosure pertains that other modifications based on the technical contents of the present disclosure can be implemented in addition to the embodiments disclosed herein.

What is claimed is:

1. A water culture block comprising:
  a block body including a bottom plate and a plurality of side plates, each side plate being perpendicular to the bottom plate, the block body having an inner space formed therein, and the bottom plate comprising a plurality of drain holes; and
  an overflow partition zone comprising:
    a plurality of anti-interference column pipes upwardly extending from the bottom plate and respectively positioned above the plurality of drain holes, each of the plurality of anti-interference column pipes comprising a lower end connected to the bottom plate and an upper end opposing the lower end, and a plurality of overflow partition walls upwardly extending from the bottom plate, each of the plurality of overflow partition walls respectively connecting two adjacent ones of the plurality of anti-interference column pipes such that the plurality of overflow partition walls and the plurality of anti-interference column pipes together surround an overflow drain space in the overflow partition zone, wherein each of the plurality of anti-interference column pipes comprises an inner side opening in fluid communication with the overflow drain space to discharge a fluid overflowing in the block body through the inner side opening and a corresponding one of the plurality of drain holes, wherein the inner side opening continuously extends from the lower end to the upper end of each anti-interference column pipe to cause the fluid overflowing from the inner space into the overflow drain space to be discharged through the inner side openings and the drain holes, wherein the plurality of anti-interference column pipes comprise a first column pipe, a second column pipe, a third column pipe, and a fourth column pipe, wherein the first column pipe and the third column pipe are disposed diagonally to each other, and the inner side opening of the first column pipe and the inner side opening of the third column pipe face each other, and wherein the second column pipe and the fourth column pipe are disposed diagonally to each other, and the inner side opening of the second column pipe and the inner side opening of the fourth column pipe face each other.

2. The water culture block of claim 1, wherein the bottom plate comprises, on a lower surface thereof, a coupling portion to which a top portion of at least one other water culture block is coupled.

3. The water culture block of claim 2, wherein the bottom plate comprises, on a lower surface thereof, a plurality of drain passages each of which protrudes downward and has a hollow extending from the drain hole.

4. The water culture block of claim 3, further comprising:
a plurality of drain pipes coupled to the plurality of drain passages, respectively, and configured to distribute the overflowing fluid to at least one other water culture block.

5. The water culture block of claim 3, further comprising:
an auxiliary drain pipe configured to collect the fluid drained from the plurality of drain passages and discharge the fluid into one tube.

6. The water culture block of claim 1, further comprising:
a cover plate that covers at least one of the plurality of side plates.

7. The water culture block of claim 6, wherein the cover plate comprises a plurality of front protrusions uniformly disposed on a front surface thereof.

8. The water culture block of claim 7, further comprising:
a plurality of image blocks selectively attached to the plurality of front protrusions.

9. The water culture block of claim 1, wherein the plurality of anti-interference column pipes have a height measured from the bottom plate that is greater than that of the plurality of overflow partition walls.

10. The water culture block of claim 1, wherein each of the plurality of anti-interference column pipes comprises a channel in fluid communication with the corresponding drain hole and the inner side opening.

11. The water culture block of claim 1, wherein the bottom plate further comprises at least one supply passage configured to provide a passage of a fluid providing pipe, and wherein the at least one supply passage has a height greater than that of the plurality of overflow partition walls.

12. The water culture block of claim 1, wherein all of the inner side openings of the first to fourth column pipes face a center region of the overflow drain space.

13. The water culture block of claim 1,
wherein the plurality of overflow partition walls comprise:
a first partition wall connecting the first column pipe and the second column pipe, and
a second partition wall connecting the second column pipe and the third column pipe, and
wherein the first partition wall and the second partition wall are angled with respect to each other.

14. The water culture block of claim 13,
wherein the plurality of overflow partition walls further comprise:
a third partition wall connecting the third column pipe and the fourth column pipe, and
a fourth partition wall connecting the fourth column pipe and the first column pipe, and
wherein the third partition wall and the fourth partition wall are angled with respect to each other.

15. The water culture block of claim 14, wherein the first partition wall and the third partition wall face each other, and the second partition wall and the fourth partition wall face each other.

* * * * *